July 30, 1940.  A. DROTH  2,209,676

REINFORCING RETURN BEND

Filed July 1, 1939

INVENTOR
ALFRED DROTH
BY
ATTORNEY

Patented July 30, 1940

2,209,676

UNITED STATES PATENT OFFICE 2,209,676

REINFORCING RETURN BEND

Alfred Droth, Kassel-Wilhelmshohe, Germany, assignor to The Superheater Company, New York, N. Y.

Application July 1, 1939, Serial No. 282,351
In Germany July 12, 1938

5 Claims. (Cl. 29—157.6)

The present invention relates to an improved method of forming a return bend or breeches piece joining two or more tubes.

According to a known welding process for the fabrication of return bends joining two or more tubes, the tubes are heated and inserted in a die and are then welded to each other by the introduction of a suitably shaped plunger. This results in what is usually referred to as a breeches piece whose open end is next closed by a separate step when forming a return bend. As usually practiced this process is such that compared with the general wall thickness of the tubes there is a reinforcement of the wall both at the inner or crotch area as well as along the outer arc of the closure. This process has been so successful that return bends made by it have been very generally adopted. Under certain operating conditions however and with certain forms of superheater elements the unequal temperature and consequent unequal expansion of the two tube lengths connected by the return bend has caused stresses to occur at the return bend which may at times cause a failure.

The object of the present invention is to modify the process in such a way that a further reinforcement is provided at the return bend which will effectively prevent any rupture at this point. The invention consists in forming an exterior reinforcing web disposed between and connecting the two tubes to each other. Material for forming the web in a forge welding operation is provided by one or more small plates attached to the exterior facing walls of the two tubes.

The welding is performed by means of a die which in general has the same form as dies used heretofore for this process but modified by having the wall which separates the two bores formed within the die to hold the two tubes relieved at the crotch to receive metal upset during the forging to form the desired web.

In the drawing Figure 1 is a vertical sectional view through the center line of the die along the line I—I in Figure 3 with the tube ends in place and the forging plunger partially advanced.

Figures 1, 2:
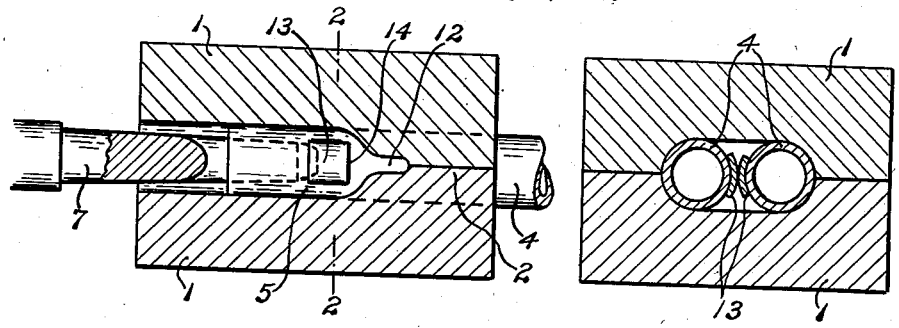
Figure 2 is a transverse sectional view on the line 2—2 in Figure 1.
Figure 3:
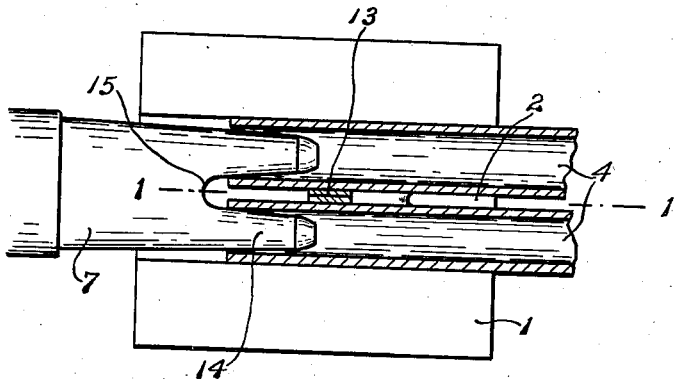
Figure 3 is a plan view of the lower die half with the tubes in place and shown in cross section.
Figure 4:
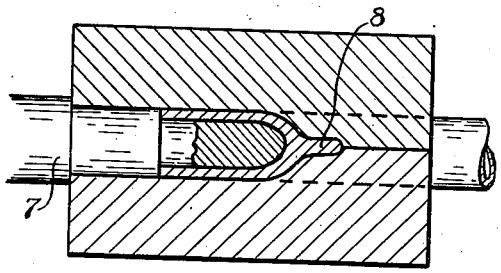
Figure 4 is a view similar to Figure 1 but showing the conditions at the end of the forging operation.

Each of the two halves 1 of the die has the usual two semi-cylindrical grooves separated by the wall 2, the tubes 4 being received in the grooves for the formation of the breeches piece and reinforcing web. At its inner end the wall 2 is relieved as appears in Fig. 1 so that when the die halves are assembled, a cavity 12 is formed in the die extending to the right from the cavity 5 provided for the breeches piece.

Figure 6:
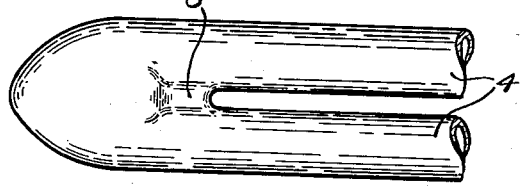
Figure 6 is a plan view of the completed return bend and illustrates the location of the reinforcing web.

In the preferred form of the invention small arcuate plates 13 curved to the contour of the tubes 4 are attached to the outer wall of each tube before the latter are placed in the die. The plates 13 are attached to the tubes 4 in any suitable way as by tack welding. The plates are attached to the tubes so that the side edges 14 thereof which are remote from the pipe ends are disposed at approximately the position where the crotch will be located in the completed breeches piece. After the tubes 6 and plates 13 thereon are heated, they are placed and held in the die so that the plates 13 on the two tubes face each other. During the stroke of the plunger 7 to slit the walls of the tubes 4 a distance from the end, bend the portions adjacent to the slits out thereby bringing their edges into contact and weld them to each other, the material of the plates 13 is forced into the cavity 12 by the bridge part 15 between the fingers of the plunger. As a consequence the material of the plates 13 is thus utilized to form a web 8 (Fig. 6) integral with the two tubes 4 and extending along and between them from the crotch of the breeches piece.

Figure 5:
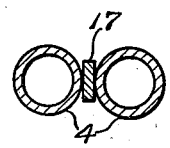
Figure 5 is a cross sectional view of two tubes that are to have a breeches piece formed at their ends with a single plate positioned between the two tubes to provide material for the reinforcing web.

Fig. 5 illustrates two tubes in which a single plate positioned between their facing walls is utilized instead of a plate for each tube as in Fig. 2.

As described herein there will be formed at the return bend area of the breeches piece a web 8 extending between the two tube branches 4 of the piece and connecting the inner side walls of the two tubes. The thickness of this connecting web is increased toward the crotch and is therefore greatest where the danger of rupture is greatest. Not only does this construction provide increased mechanical strength but it also presents increased guarantee against leakage from the interior steam pressure at this critical point. With the exceedingly high steam pressures used in modern practice there is a certain amount of difficulty in making the crotch of the return bend sound enough to meet the requirements. The invention improves matters since the additional material forced into the structure at this point provides such a section that steam is effectively prevented from leaking out at this point.

What I claim is:

1. In the art of connecting two pipes into a breeches piece by the steps of heating the pipe portions adjacent the ends to be connected, holding the pipes in the position they will occupy in the finished piece when connected, slitting the walls facing each other for a distance inward from the end, and bending the portions adjacent to the slits outward thereby bringing their edges into contact and welding them to each other, the improvement consisting of the steps of placing a metallic plate between the pipes with that side edge of the plate remote from the pipe end disposed at approximately the position of the breeches piece and forge welding said plate integral with the pipes to form a web extending between and along the pipes from the crotch.

2. In the art of connecting two pipes into a breeches piece by the steps of heating the pipe portions adjacent the ends to be connected, holding the pipes in the position they will occupy when connected, slitting the walls facing each other for a distance inward from the end, and bending the portions adjacent to the slits outward thereby bringing their edges into contact and welding them to each other, the improvement consisting of the steps of attaching a metallic plate to the outer wall of at least one pipe with that side edge of the plate remote from the pipe end disposed at approximately the position where the crotch of the breeches piece will be located, and forge welding said plate integral with the pipes to form a web extending between and along the pipes from the crotch.

3. In the art of connecting two pipes into a breeches piece by the steps of heating the pipe portions adjacent the ends to be connected, holding the pipes in the position they will occupy in the finished piece when connected, slitting the walls facing each other for a distance inward from the end, and bending the portions adjacent to the slits outward thereby bringing their edges into contact and welding them to each other, the improvement consisting of the steps of attaching an arcuately curved plate to each pipe with its convex surface contacting the pipe and with that edge of each plate which is furthest from the pipe end disposed at approximately the position where the crotch of the breeches piece will be located, and forge welding said plates integral with the pipes to form a web extending between and along the pipes from the crotch.

4. The improvement according to claim 2 wherein the plate is attached to the pipes prior to heating thereof and the connections of the pipes to create a breeches piece and the formation of a web are effected in one continuous operation.

5. The improvement according to claim 2 wherein the plate is attached to a pipe by tack welds.

ALFRED DROTH.